Mar. 6, 1923.
J. E. MILLER
LAWN EDGING IMPLEMENT
Filed Nov. 29, 1919
1,447,805
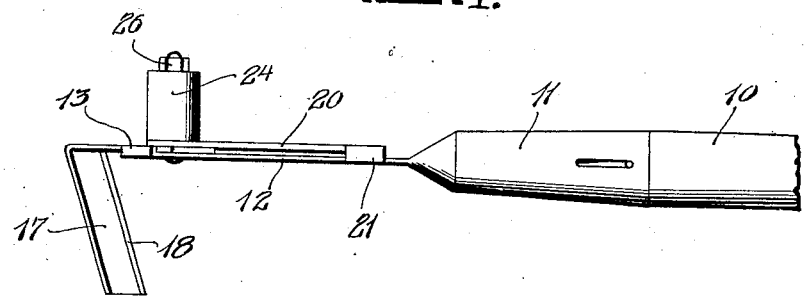
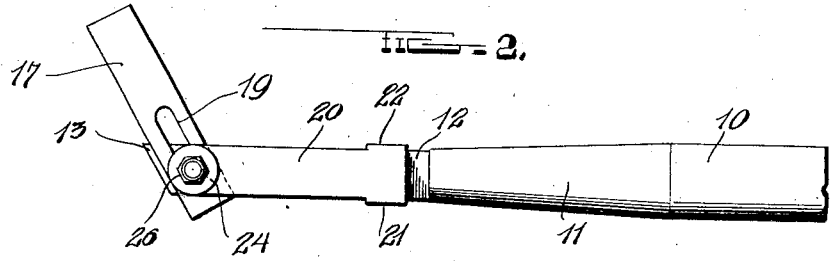
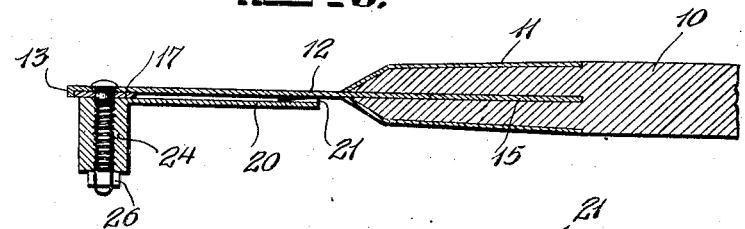
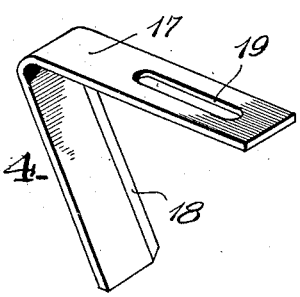 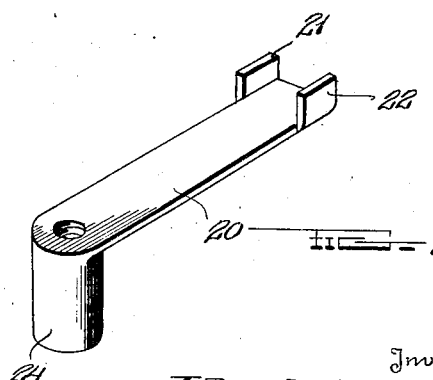
Witnesses
Inventor
John E. Miller
By Victor J. Evans
Attorney Patented Mar. 6, 1923.                                                   1,447,805

UNITED STATES PATENT OFFICE.

JOHN E. MILLER, OF OLEAN, NEW YORK.

LAWN-EDGING IMPLEMENT.

Application filed November 29, 1919. Serial No. 341,371.

*To all whom it may concern:*

Be it known that I, JOHN E. MILLER, citizen of the United States, residing at Olean, in the county of Cattaraugus and State of New York, have invented new and useful Improvements in Lawn-Edging Implements, of which the following is a specification.

This invention relates to a lawn edging implement, and the object is to provide a device of the type indicated for use in trimming the edges of lawns adjacent to walks and the like.

A further object is to provide an implement which shall consist of a handle, a shank portion connected therewith, a blade, and means of novel construction for adjustably connecting the blade with the shank portion.

A still further object is to provide, in connection with a handle, including a shank portion, a cutting blade having a slot near one end thereof, a plate provided with offset portions engaging the shank, the plate carrying a boss, and a screw or bolt passing through the shank portion and the aforesaid slot and also passing through the boss, and being engaged by a nut, retaining the elements in an adjusted position.

With the foregoing and other objects in view, the invention consists in the novel construction combination and arrangement of elements hereinafter described and claimed.

In the drawing, Figure 1 is a plan view of the device; Figure 2 is a side elevation thereof; Figure 3 is a longitudinal section; Figure 4 is a perspective view of the blade; Figure 5 is a perspective view of the clamping element.

In carrying out the invention I provide a handle 10, one end of which is received by a socket 11, and from the end of this socket element there extends a shank portion 12 having one end deflected at an angle as shown at 13. The shank portion may pass into the interior of the socket and enter a slot 15 in the end of the handle.

The blade 17 is of V shape, and is provided with a cutting edge 18 and with a slot 19 near one end.

A clamping plate 20 is provided with ears 21 and 22 adapted to engage the edges of the shank portion, and is further provided with a boss or cylindrical gaging similar element 24 engaged by a screw 25, in the event that the boss is threaded. If not threaded, the screw or bolt passes directly through the boss. An engaging nut is shown at 26. The offset portion 13 is designed to engage the edge of the blade at the point shown.

The slot in the end of the blade provides for adjustment, and the screw or bolt passes through the shank portion 12, through the slot, and through the boss, and is retained as specified.

I do not wish to be limited to the exact construction shown and described, but may make such changes, alterations, or additions as fall within the scope of the appended claim.

What is claimed is—

In a device of the class described, a shank portion having blade engaging means formed thereon, an angular cutting blade provided with a slot and adjustable with reference to the shank, an arm extending along the shank, ears formed on the arm and engaging the edges of the shank, and a gaging device on said arm.

In testimony whereof I affix my signature.

JOHN E. MILLER.